United States Patent Office 3,418,284
Patented Dec. 24, 1968

3,418,284
COPOLYMERIZATION OF TRIOXANE AND NORBORNADIENE OR A MONOALKYL-SUBSTITUTED DERIVATIVE THEREOF IN THE SOLID STATE
Howard E. Everson, Mentor, Kornel D. Kiss, University Heights, Ohio, and Jerry T. Reed, Houston, Tex., assignors to Diamond Shamrock Corporation, a corporation of Delaware
No Drawing. Filed June 7, 1965, Ser. No. 462,088
14 Claims. (Cl. 260—73)

ABSTRACT OF THE DISCLOSURE

Thermally stable oxymethylene copolymers having an inherent viscosity of at least 1.0 are prepared by reacting trioxane and norbornadiene or a monoalkyl-substituted norbornadiene substantially in the solid state in the presence of a cationically-active polymerization catalyst. The mixture of monomers with the catalyst and optionally with up to 30%, by volume of the total reaction mixture, of an organic liquid reaction medium is maintained at 60° to 68° C. until initiation of copolymerization is effected, after which the mixture is solidified by being cooled to a temperature of 30° to 50° C., along with agitation to provide the reaction mixture in pulverulent form. While copolymerization is being completely effected, the solidified reaction mixture is gradually warmed to a maximum temperature of 68° C., and the copolymer product is recovered in granular form.

This invention relates to the preparation of thermoplastic compositions. More particularly, it relates to improvements in the production of oxymethylene copolymers having a high degree of thermal stability.

Copending application Ser. No. 449,271, filed Apr. 19, 1965, now U.S. Patent No. 3,344,120, Sept. 26, 1967, relates to a thermoplastic copolymer of excellent inherent thermal stability which is prepared from a mixture containing a major amount of trioxane and a minor amount of a norbornadiene monomer having the structural formula

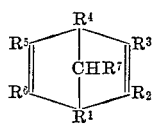

wherein $R^1$ to $R^7$ are each selected from the group consisting of hydrogen and lower alkyl radicals containing up to 4 carbon atoms with no more than one R being an alkyl radical.

As set forth in U.S. Patent No. 3,344,120, Sept. 26, 1967, the process for preparing this copolymer is a batch-type process in which the above-described monomer mixture, optionally in the presence of a solvent of organic liquid reaction medium, is contacted with a cationically-active catalyst in an inert atmosphere and substantially under anhydrous conditions, the said reaction being carried out at a temperature ranging generally from 30° to 100° C. for a time period of from 0.5 to 20 hours. The copolymer which is a solid product mass as recovered from the reactor has an inherent viscosity of at least 0.7, which value corresponds to an average copolymer molecular weight of approximately 10,000. Inherent viscosity is employed to indicate the average molecular weight of the copolymer product. A copolymer having an inherent viscosity of at least 1.0 and preferably 1.2 (an average molecular weight of about 30,000) has more useful property levels and is desired for the preparation of particularly useful plastic articles.

We have now found that trioxane-norbornadiene copolymers having an inherent viscosity of at least 1.0 and preferably 1.2 or above can be prepared regularly and consistently by a process wherein the monomers are reacted substantially in the solid state. This process which may be adapted to large-scale commercial operation is carried out by first solidifying the reaction mixture by cooling it to a temperature substantially below the solidification temperature of the trioxane; and then warming this solidified reaction mixture to a temperature up to or slightly above the solidification temperature of the trioxane, the monomers being converted to copolymer product substantially during this warming period. In an especially preferred method for carrying out the process, the reaction mixture is continuously subjected to shearing and blending during the cooling and warming phases of the reaction whereby the copolymer is prepared directly in predominantly granular form.

As used herein in the specification and claims and as represented by the structural formula above, the term "norbornadiene monomer" refers to unsubstituted norbornadiene and to norbornadienes having only one lower alkyl group attached to the norbornadiene ring as, for example, those compounds substituted in the 2- and 4-positions of the norbornadiene ring such as 2-methyl norbornadiene or 4-methyl norbornadiene. However, because of its ready availability, unsubstituted norbornadiene is the presently preferred monomer for use in this invention and specific reference will be made hereinafter to this monomer. Such reference is not to be taken, however, as limiting the present invention but merely as being illustrative thereof.

In one embodiment of the invention, the copolymerization ingredients are initially reacted in a conventional reactor such as a jacketed flask or glass-lined polymerization vessel equipped with stirring apparatus and maintained at a temperature sufficiently high to keep the trioxane in molten form, e.g., 60° to 65° C. When copolymerization has been initiated in the reaction mixture, as visually evidenced by the appearance of solid copolymer, the mixture is transferred into a jacketed precooled reactor adapted to provide high shear thereto. Suitable reactors of this type include, for example, a Sigma mixer such as manufactured by the Read Corporation, the "Ko-Kneader" which is described in U.S. Patent 2,505,-125, a Banbury mixer or a Brabender plastograph (such as manufactured by the Brabender Corporation). The high shear reactor usually is equipped with a thermocouple for measuring the temperature of the reaction mixture. Temperature control is maintained in the reactor by circulating water in the jacket. It should be pointed out that the reaction mixture at this phase of the reaction comprises a suspension of precipitated copolymer in excess monomer (and optionally, solvent) which is of relatively fluid consistency and can pass easily through a stopcock having a ⅛-inch bore. The maximum solid copolymer composition of the suspension is approximately 20 to 25 percent, by weight. It is to be understood, of course, that in larger scale equipment the solids content of the reaction mixture can be much higher during transfer, e.g., 35 to 40 percent by weight, without hampering flow of the mixture.

In the high shear reactor, the reaction mixture is solidified, broken up into lumps and substantially pulverized. The resultant dry particulate material is a mixture of copolymer, unreacted monomers and catalyst (and optionally, occluded solvent). This material is then gradually reheated to a temperature up to or above the solidification temperature of the trioxane, while the monomers in the dry mixture are converted to copolymer. It is especially interesting to note that during heating, there is no visual evidence of a liquid phase in the reactant material. The absence of a visible liquid phase is indeed surprising and unexpected in view of the significant quantity of unreacted trioxane and, in some instances, solvent present in the reaction mixture.

Alternatively, the process of this invention may be carried out employing only a jacketed high-shear reactor such as described above. In this method, the reaction ingredients are charged to the reactor which is maintained at a temperature of 60° to 65° C. When copolymerization has been initiated in the agitated reaction mixture, the reactor is cooled by circulating water through the packet. The mixture is thus solidified and pulverized. Copolymerization is then completed by reheating the dry particulate reaction mixture, as previously described.

The process of this invention may also be carried out by mixing the ingredients in a conventional reactor maintained at 60° to 65° C. until copolymerization is initiated. The reaction mixture is then transferred into a closed jacketed mold which has been precooled to about 30° C. This type apparatus is referred to herein as a flat-plate reactor. It consists of two plates of a material with good heat transfer characteristics, e.g., stainless steel, which are fitted one on top of the other and are separated by a Teflon frame which constitutes the mold cavity. The abutting surfaces of each mold face are lined with gaskets of an inert material such as silicone rubber and the entire assembly is tightly clamped together. It is connected to the first reactor by a valved line attached to the top of the mold and is also provided with venting means whereby a slight positive inert gas pressure can be maintained therein. The reaction mixture solidifies in the flat-plate reactor and is then heated as previously described. Upon removal from the reactor, the copolymer product mass is pulverized.

Another method for carrying out the invention which may be adapted to large-scale commercial operation comprises effecting the copolymerization in a fluidizing reactor. In this method, the reaction mixture is first solidified in a high sheer reactor as described previously. The particulate reactant material is then added to a jacketed fluidizing apparatus maintained at a temperature about 60° C. Copolymerization is effected in the reaction mixture while it is fluidized by the flow of an inert gas such as nitrogen through the reactor.

The process of this invention generally may be carried out in a time period ranging from approximately 1 to 5½ hours, regardless of the method employed. This general reaction time includes the times involved for initiation of the reaction and for the subsequent cooling and warming phases thereof. Copolymerization initiation may be effected in from 5 to 30 minutes after addition of catalyst to the reaction mixture. The cooling phase generally is carried out in a time period ranging from 20 minutes to 2 hours, while the warming phase generally is effected in from 30 minutes to 3 hours.

The process is conducted at a temperature ranging generally from 30° to 68° C. Within this temperature range, initiation of the reaction is effected usually at 60° to 65° C. The reaction mixture is then cooled to a minimum temperature of about 30° C. and subsequently may be warmed to a maximum temperature of about 68° C.

The copolymer products prepared according to this invention generally contain from about 90 to about 99.9 mol percent of recurring oxymethylene units and from about 0.1 to 10 mol percent of recurring units derived from norbornadiene, as determined by elemental carbon-hydrogen analysis. The preferred copolymers contain from 95 to 99.7 mol percent of oxymethylene units and from about 0.3 to 5 mol percent of the said norbornadiene units. These copolymer products have an inherent viscosity of at least 1 and, preferably 1.2 or above, which inherent viscosity value is determined at 60° C. employing a solution containing 0.5 g. of the copolymer in 100 ml. of solution, the solvent being p-chlorophenol containing 2 percent of alpha-pinene by weight. The copolymer products are tough and durable materials which may be fabricated into a variety of useful plastic articles by conventional processing methods as practiced at the present time. They are characterized by an inherent high degree of thermal stability. The thermal stability of these copolymers is measured in an inert atmosphere by known thermogravimetric analytical techniques, using a Stanton Automatic Recording Thermobalance, Hi Temperature Model, maintained at 220° C. When tested, the copolymers of this invention degrade at a slow steady rate throughout a major portion of the degradation period after initially degrading at a fast rate due to the removal of unstable chain ends from the copolymer. This slow steady degradation rate characterizes the true stable nature of the copolymer. Therefore, the reaction rate constant for thermal degradation of the copolymers is represented by their slow degradation rate and is expressed as weight percent per minute. The copolymers produced by the process of this invention exhibit a reaction rate constant for thermal degradation at 220° C. of 0.4 weight percent per minute or less, with the preferred products exhibiting a reaction rate constant of 0.2 weight percent per minute or less.

As described in the process of U.S. Patent No. 3,344,120, Sept. 26, 1967, the copolymerization reaction is effected in the presence of a cationically-active catalyst. Suitable catalysts of this type include Lewis acids such as the halides of metals as aluminum, boron, tin, titanium, zirconium, strontium, niobium and the like; and coordination complexes of such metal halides with organic compounds wherein oxygen, nitrogen or sulfur is the donor atom. In practice, the coordination complexes of metal halides presently are more suitably employed with the coordinate complexes of boron trifluoride being especially preferred. Suitable boron trifluoride complexes may be, for example, a complex of boron trifluoride with an alcohol, a phenol, an acid, an ether, an acid anhydride, an ester, a ketone, an aldehyde, a dialkyl sulfide, a mercaptan, and the like. Of these types, to boron trifluoride complexes with ethers such as diethyl ether, dibutyl ether, etc. are especially preferred. As shown hereinafter by specific example, copolymerization also may be effected employing as catalyst, a liquid activated polymeric species which is formed by contacting either norbornadiene monomer alone or in admixture with trioxane with a cationically-active catalyst such as previously described. This reaction initiator which is essentially an oligomer of the monomer or monomer mixture and which is referred to generally herein as a "prepolymer" catalyst, is described in copending patent application Ser. No. 462,087 filed of even date herewith in the names of Michael R. Tirpak, Irving Rosen, Richard M. Wilhjelm, Jerry T. Reed and Kornel D. Kiss. The catalyst may be used in amounts ranging generally from about 0.05 to about 10.0 millimols for each mol of trioxane employed. However, the preferred catalyst concentration is about 0.1 to 3.0 millimols per mol of trioxane.

The copolymerization reaction may be effected either in the presence or the substantial absence of a solvent or organic liquid reaction medium. Suitable such liquids include aliphatic and cycloaliphatic hydrocarbons, e.g., hexane, cyclohexane, heptane, etc. If employed, the solvent is used typically in an amount not exceeding 30 percent by volume of the total reaction mixture.

As it has been found that trace contaminants such as moisture present in the reaction mixture or introduced therein by contact with atmospheric air substantially inhibit monomer conversion to the desired copolymers in good practical yields, it is necessary that the process be conducted under essentially anhydrous conditions in an inert atmosphere. Accordingly, the catalyst employed is prepared and kept dry prior to use in a nitrogen atmosphere. The monomeric materials are dried by careful distillation over a dehydrating agent such as sodium and/or by dehydration processes using a suitable absorbent such as molecular sieves, silica gel and the like. When employed, the solvent medium may be dehydrated by standard distillation and drying methods.

Upon completion of the reaction the copolymer product is recovered from the reactor and is purified by washing it with acetone, for example, to remove any unreacted monomers and/or low molecular weight homopolymers remaining. Additionally, it may be heated briefly at a temperature of 100° to 160° C. to decompose any unstable chain ends.

In order that those skilled in the art may more completely understand the present invention and the preferred methods by which the same may be carried into effect, the following specific examples are offered.

EXAMPLE 1

A jacketed, one-quart Sigma mixer fitted with a glass top plate containing nitrogen inlet and outlet tubes, a serum cap for injection of ingredients and a thermocouple for measuring the temperature of the reaction mixture, is purged with nitrogen. It is maintained at 61° C. by circulating water through the jacket. While continuing to maintain a slight positive nitrogen pressure on the system, the mixer is charged with 504 ml. of molten trioxane, 20.4 ml. of norbornadiene and 108 ml. of cyclohexane and agitation is started (at a mixer paddle speed of 68 r.p.m.). Eight and five-tenths ml. of a one-molar solution of boron trifluoride dibutyl etherate in cyclohexane is added to the mixer. Copolymerization is initiated 16 minutes after catalyst addition as evidenced by the formation of insoluble copolymer. By substantially increasing cold water flow through the mixer jacket, the agitated reaction mixture is then cooled to 36° C. and maintained at this temperature, the total cooling time period being 1 hour and 40 minutes. By then circulating hot water through the mixer jacket, the dry, particulate reaction mixture is warmed to 58° C. and is then maintained at this temperature for a total heating period of 2½ hours. The total reaction time is approximately 4½ hours. The copolymer product is recovered in 94% yield and is in granular form. It is washed with acetone, hot water and again with acetone and is finally dried at 50° C. under vacuum. This copolymer has an inherent viscosity of 1.14. It has a reaction rate constant for thermal degradation at 220° C. of 0.08 weight percent per minute, 70 percent of the copolymer remaining stable after the initial degradation period of the heat stability test has been completed.

EXAMPLE 2

Employing the Sigma mixer as used in Example 1, using the same copolymerization recipe and following the same general procedure, a copolymer is prepared in a process wherein the cooling and warming time periods of the reaction are varied from those employed in the process of Example 1. In this example, the reactor which initially is maintained at 61° C. is not cooled until the copolymerization mixture has been reacted for 27 minutes after the addition of catalyst. The reaction mixture is cooled to a temperature of 44° C. and is then maintained at this temperature for a total cooling time period of 55 minutes. The solidified, particulate reaction mixture is then warmed to 58° C. and maintained at this temperature, the total heating time period of this example, however, being 3 hours. The total reaction time is approximately the same as in Example 1. The copolymer product is purified and dried as in Example 1. It is recovered in 99 percent yield. This finished copolymer has an inherent viscosity of 1.41. It has a reaction rate constant for thermal degradation at 220° C. of 0.10 weight percent per minute, 77 percent of the copolymer remaining stable after the initial degradation has been completed.

EXAMPLE 3

In this example, a trioxane-norbornadiene copolymer is prepared using the same copolymerization recipe as previously described and initiating the reaction in a jacketed, one-liter polymerization flask which is fitted with nitrogen inlet and outlet tubes, a serum cap for injection of ingredients, an agitator and a thermocouple. The flask which is initially at a temperature of 61° C., is connected to the Sigma mixer by means of a stopcock having a ⅛-inch bore. The flask is charged with the reaction ingredients. Copolymerization is initiated in the reaction mixture 8 minutes after catalyst addition. The reaction mixture is then transferred via the stopcock into the Sigma mixer which has previously been cooled by circulating water in the jacket.

While shearing and blending of the reaction mixture are effected in the mixer, it is cooled to 47° C. and maintained at this temperature, the total cooling time being 27 minutes. As described previously, the solidified, particulate material is then warmed to 63° C. and is continually blended while being maintained at this temperature, the total warming cycle being effected in 1¾ hours. The total reaction time is 2⅓ hours. The particulate copolymer is recovered in 85 percent yield. It has an inherent viscosity of 1.09. The reaction rate constant for thermal degradation for this copolymer at 220° C. is 0.05 weight percent per minute, 82 percent of the copolymer remaining stable after initial degradation is completed.

EXAMPLE 4

In this example, a trioxane-norbornadiene copolymer is prepared in the absence of solvent. A "prepolymer" catalyst is prepared by mixing together for 5 minutes in a 100-ml. jacketed flask maintained at 65° C., 21 ml. of trioxane, 15.7 ml. of norbornadiene and 1.15 ml. of distilled boron trifluoride dibutyl etherate catalyst. The resulting liquid monomer-catalyst complex is charged via a stopcock into the previously described jacketed Sigma mixer which contains an agitated mixture of 534 ml. of trioxane and 6.7 ml. of norbornadiene. The reaction mixture is then cooled to 36° C. and is maintained at this temperature while solidification of the mixture is effected, the total cooling time being 70 minutes. The solidified, particulate reaction mixture is then warmed to at least 52° C. and maintained at this temperature while continuously being blended. The total heating time is 50 minutes, while the total time of the reaction is slightly over 2 hours. The copolymer product which is recovered in 84 percent yield is purified and dried as described previously. This copolymer has an inherent viscosity of 1.17. It has a reaction rate constant for thermal degradation at 220° C. of 0.08 weight percent per minute, 72 percent of the copolymer remaining stable after the initial degradation has been completed.

EXAMPLE 5

The process of this invention is further illustrated on a small scale by preparing a trioxane-norbornadiene copolymer in a jacketed Brabender Plastograph of about 70 ml. capacity. In this example 50 ml. of trioxane, 2.02 ml. of norbornadiene and 21.44 ml. of cyclohexane are charged to a 100 ml. jacketed flask which is equipped as described in Example 2 and which is maintained at 60° C. After thoroughly mixing these ingredients, 1.19 ml. of the previously described boron trifluoride dibutyl etherate catalyst solution is added to the flask. Copolymerization is initiated in the reaction mixture 20 minutes after catalyst addition. The mixture is then transferred through a connecting stopcock into the Plastograph which has a jacket temperature of 30° C. The mixture is solidified with simultaneous pulverization and is maintained in the plastograph for 1½ hours. The copolymer product is then recovered, purified and dried. The finished product has an inherent viscosity of 1.4.

It is to be understood that although the invention has been described with specific reference to particular embodiments thereof, it is not to be so limited, since changes and alterations therein may be made which are within the full intended scope of this invention as defined by the appended claims.

What is claimed is:

1. In a process for preparing a thermoplastic oxymethylene copolymer composition having a high degee of thermal stability in which a mixture containing a major amount of trioxane and a minor amount of a norbornadiene monomer having the structural formula

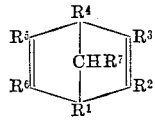

where $R^1$ to $R^7$ are each selected from the group consisting of hydrogen and lower alkyl radicals containing up to 4 carbon atoms with no more than one R being an alkyl radical, is contacted in an inert atmosphere under substantially anhydrous conditions with a polymerization catalyst which is a halide of aluminum, boron, tin, titanium, zirconium, strontium, or niobium, a coordination complex of any of such metal halides with an organic compound wherein oxygen, nitrogen or sulfur is the donor atom, or an activated liquid trioxane-norbornadiene oligomer, the improvement which comprises maintaining in a molten condition, the mixture of said monomers catalyst and from 0 percent up to 30 percent, by volume of the total reaction mixture, of a liquid aliphatic or cycloaliphatic hydrocarbon medium until solid copolymer formation is initally effected in the reaction mixture; thereafter cooling the said reaction mixture to a temperature ranging from 30° C. to 50° C. while applying high shear thereto, whereby the reaction mixture is solidified and reduced to pulverulent form simultaneously; and finally heating with continued shearing action the resultant particulate reaction mixture up to a maximum temperature of about 68° C. while copolymerization is completed therein and the granular copolymer product recovered has an inherent viscosity of at least 1.0, as determined at 60° C., employing a solution containing 0.5 g. of the said copolymer product per 100 milliliters of solution, the solvent being p-chlorophenol containing 2 percent of alpha-pinene, by weight.

2. The process of claim 1 in which the norbornadiene monomer is unsubstituted norbornadiene.

3. The process of claim 1 in which the norbornadiene monomer is 2-methyl norbornadiene.

4. The process of claim 1 in which the copolymer product obtained has an inherent viscosity of at least 1.2.

5. The process of claim 1 in which the copolymer product obtained comprises essentially from about 90 up to 99.9 percent of recurring oxymethylene units and from about 0.1 up to 10 percent of recurring units derived from the said norbornadiene monomer, the said copolymer product having a reaction rate constant for thermal degradation at 220° C. of no more than 0.4 weight percent per minute.

6. The process of claim 1 which is carried out in the presence of up to 30 percent, by volume of the total reaction mixture, of cyclohexane.

7. The process of claim 1 in which the catalyst is a boron trifluoride coordinate complex with an ether.

8. The process of claim 1 in which the catalyst is employed in an amount ranging from 0.05 to 10 millimols per mol of trioxane.

9. The process of claim 1 which is conducted in a time period of from 1 to 5½ hours.

10. A reproducible process for preparaing a thermoplastic, thermally stable oxymethylene copolymer composition predominantly in granular form which comprises cooling to a temperature ranging between 30° to 50° C., in an inert atmosphere and under substantially anhydrous conditions, a molten mixture containing a major amount of trioxane, a minor amount of norbornadiene, from 0 percent to 30 percent, by volume of the said total reaction mixture, of a liquid aliphatic or cycloaliphatic hydrocarbon medium and between 0.05 to about 10 millimols per mol of trioxane of a catalyst which is a halide of aluminum, boron, tin, titanium, zirconium, strontium or niobium, a coordination complex of any of such metal halides with an organic compound wherein oxygen, nitrogen or sulfur is the donor atom, or an activated liquid trioxane-norbornadiene oligomer, while applying high shear to said reaction mixture during the cooling thereof, whereby the said molten reaction mixture solidifies and is simultaneously reduced to predominantly pulverulent form; thereafter heating with continued shearing the resultant particulate reaction mixture up to a maximum temperature of about 68° C. while copolymerization of any unreacted monomers is substantially completed therein; and recovering a graunlar copolymer product having an inherent viscosity of at least 1.0, as determined at 60° C., employing a solution containing 0.5 g. of the said copolymer product per 100 milliliters of solution, the solvent being p-chlorophenol containing 2 percent of alpha-pinene, by weight.

11. The process of claim 10 in which the copolymer product obtained has an inherent viscosity of at least 1.2.

12. The process of claim 10 in which the copolymer product obtained comprises essentially from 90 up to 99.9 percent of recurring oxymethylene units and from 0.1 up to 10 percent of recurring units derived from the said norbornadiene, the said copolymer product having a reaction rate constant for thermal degradation at 220° C. of no more than 0.4 weight percent per minute.

13. The process of claim 10 which is carried out in the presence of up to 30 percent, by volume of the total reaction mixture of cyclohexane.

14. The process of claim 10 in which the catalyst is a boron trifluoride coordinate complex with an ether.

References Cited

UNITED STATES PATENTS

| | | | |
|---|---|---|---|
| 2,989,508 | 6/1961 | Hudgin et al. | 260—67 |
| 2,989,510 | 6/1961 | Bruni | 260—67 |
| 3,294,750 | 12/1966 | Baccaredda et al. | 260—67 |
| 3,344,120 | 9/1967 | Rosen | 260—73 |

WILLIAM H. SHORT, *Primary Examiner.*

L. M. PHYNES, *Assistant Examiner.*